(12) United States Patent
Rittenhouse

(10) Patent No.: US 10,931,132 B2
(45) Date of Patent: Feb. 23, 2021

(54) HINGE MOUNTED WIRELESS CHARGING SYSTEMS AND METHODS

(71) Applicant: INTEL CORPORATION, Santa Clara, CA (US)

(72) Inventor: David Rittenhouse, Fair Oaks, CA (US)

(73) Assignee: INTEL CORPORATION, Santa Clara, CA (US)

( * ) Notice: Subject to any disclaimer, the term of this patent is extended or adjusted under 35 U.S.C. 154(b) by 311 days.

(21) Appl. No.: 15/769,732

(22) PCT Filed: Nov. 19, 2015

(86) PCT No.: PCT/US2015/061646
§ 371 (c)(1),
(2) Date: Apr. 19, 2018

(87) PCT Pub. No.: WO2017/086982
PCT Pub. Date: May 26, 2017

(65) Prior Publication Data
US 2018/0316210 A1 Nov. 1, 2018

(51) Int. Cl.
*H02J 7/02* (2016.01)
*G06F 1/16* (2006.01)
(Continued)

(52) U.S. Cl.
CPC ............ *H02J 7/025* (2013.01); *G06F 1/1616* (2013.01); *G06F 1/1632* (2013.01);
(Continued)

(58) Field of Classification Search
CPC .. H02J 7/025; H02J 50/10; H02J 50/90; H02J 50/12; H02J 7/007192; H02J 7/0042;
(Continued)

(56) References Cited

U.S. PATENT DOCUMENTS 7,436,656 B2 * 10/2008 Jiang ..................... E05B 53/003
361/679.55
8,629,653 B2 * 1/2014 Mochida ............... H02J 7/0042
320/108
(Continued)

FOREIGN PATENT DOCUMENTS

WO WO-2015152461 A1 * 10/2015 ............ H02J 7/0044

OTHER PUBLICATIONS

International Search Report received for PCT Application No. PCT/US2015/061646, dated Aug. 29, 2016.
(Continued)

*Primary Examiner* — M Baye Diao
(74) *Attorney, Agent, or Firm* — Hanley, Flight & Zimmerman, LLC

(57) ABSTRACT

A wireless energy transfer system includes an electronic device having at least two members, each housing at least a portion of the electronic device pivotably coupled via a number of hinges. A hinge member is disposed proximate at least some of the number of hinges. At least one receiver coil may be disposed in, on, or about the hinge member. Removing the receiver coil from the members housing the electronic device advantageously permits thinning of the members and a beneficial reduction in height of the electronic
(Continued)

device. A power supply may include a number of power supply coils disposed in, on, or about a power supply member. Some or all of the power supply coils may wirelessly couple to the at least one receiver coil via an electromagnetic field and transfer energy to the electronic device when the electronic device is disposed proximate the power supply.

25 Claims, 7 Drawing Sheets

(51) Int. Cl.
   *H02J 50/12* (2016.01)
   *H02J 50/10* (2016.01)
   *H02J 50/90* (2016.01)
   *H02J 7/00* (2006.01)

(52) U.S. Cl.
   CPC .......... *G06F 1/1635* (2013.01); *G06F 1/1681* (2013.01); *H02J 50/10* (2016.02); *H02J 50/12* (2016.02); *H02J 50/90* (2016.02); *H02J 7/007192* (2020.01)

(58) Field of Classification Search
   CPC ........ H02J 50/001; H02J 50/005; H02J 50/30; H02J 50/40; H02J 50/402; H02J 50/50; H02J 50/502; H02J 50/60; H02J 50/70; H02J 50/80; H02J 7/00; H02J 7/0044; H02J 7/0045; G06F 1/1616; G06F 1/1632; G06F 1/1681; G06F 1/1635
   USPC ........................................................ 320/108
   See application file for complete search history.

(56) References Cited

U.S. PATENT DOCUMENTS

| | | | |
|---|---|---|---|
| 8,975,772 B2* | 3/2015 | Lakirovich | H02J 5/005 307/9.1 |
| 9,577,467 B1* | 2/2017 | Karanikos | H02J 7/0027 |
| 9,855,437 B2* | 1/2018 | Nguyen | H02J 50/12 |
| 9,866,037 B2* | 1/2018 | Maekawa | B60L 53/124 |
| 9,876,382 B2* | 1/2018 | Sultenfuss | H02J 7/04 |
| 10,272,789 B2* | 4/2019 | Chiyo | H01F 38/14 |
| 10,411,514 B2* | 9/2019 | Slooff | H02J 7/025 |
| 2006/0046792 A1* | 3/2006 | Hassemer | H04M 1/0237 455/575.1 |
| 2011/0080052 A1 | 4/2011 | Sato | |
| 2011/0204842 A1 | 8/2011 | Nagasaki et al. | |
| 2012/0235788 A1* | 9/2012 | Lakirovich | H02J 50/12 340/5.64 |
| 2014/0197784 A1 | 7/2014 | Boldt | |
| 2014/0217965 A1 | 8/2014 | Van Wiemeersch et al. | |
| 2015/0194840 A1 | 9/2015 | Lee et al. | |

OTHER PUBLICATIONS

International Preliminary Report on Patentability and Written Report received for PCT Application No. PCT/US2015/061646, dated May 22, 2018.

* cited by examiner

HINGE MOUNTED WIRELESS CHARGING SYSTEMS AND METHODS

TECHNICAL FIELD

The present disclosure relates to wireless charging systems for electronic devices.

BACKGROUND

Inductive charging or wireless charging uses an electromagnetic field to transfer energy between two coils. Typically such charging is accomplished using a power supply coil or coils in a charging station to generate an electric field and an electronic device that includes one or more receiving coils. When the receiving coils are brought into the electric field produced by the charging station, energy is transferred, via the inductive coupling between the coils in the charging station and the coils in the device, to the electronic device.

Induction chargers typically use an induction coil to create an alternating electromagnetic field from within a charging base station, and a second induction coil in the portable device takes power from the electromagnetic field and converts it back into electric current to charge the battery. The two induction coils in proximity combine to form an electrical transformer. Greater distances between sender and receiver coils can be achieved when the inductive charging system uses resonant inductive coupling. Recent improvements to this resonant system include using a movable transmission coil (i.e. mounted on an elevating platform or arm) and the use of other materials for the receiver coil made of silver plated copper or sometimes aluminum to minimize weight and decrease resistance due to the skin effect.

Magnetic resonance charging systems wirelessly transmit electrical energy between two coils tuned to resonate at the same frequency. Based on the principles of electromagnetic coupling, a resonance-based power supply uses an oscillating current in a highly resonant coil to create an oscillating electromagnetic field. A receiver coil having the same resonant frequency is able to receive energy from the electromagnetic field and convert the received energy into an electrical current. The electrical current may be used to power and charge an electronic device. Magnetic resonance charging systems offer unique advantages in spatial freedom, enabling several inches of separation to exist between the resonance-based power supply and the receiver coil.

Regardless of the wireless energy transfer technology employed, the increasing demand for increasingly compact portable electronic devices such as portable computers, ultraportable computers, laptop computers, smartphones, and handheld computers is reflected in the emphasis currently placed on reducing the overall height (or thickness) of such devices. For example, a wireless charging receiver module disposed in a notebook computer base increases the overall height of the base—such increases in thickness are generally met with resistance from manufacturers who desire a slim profile.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1A:
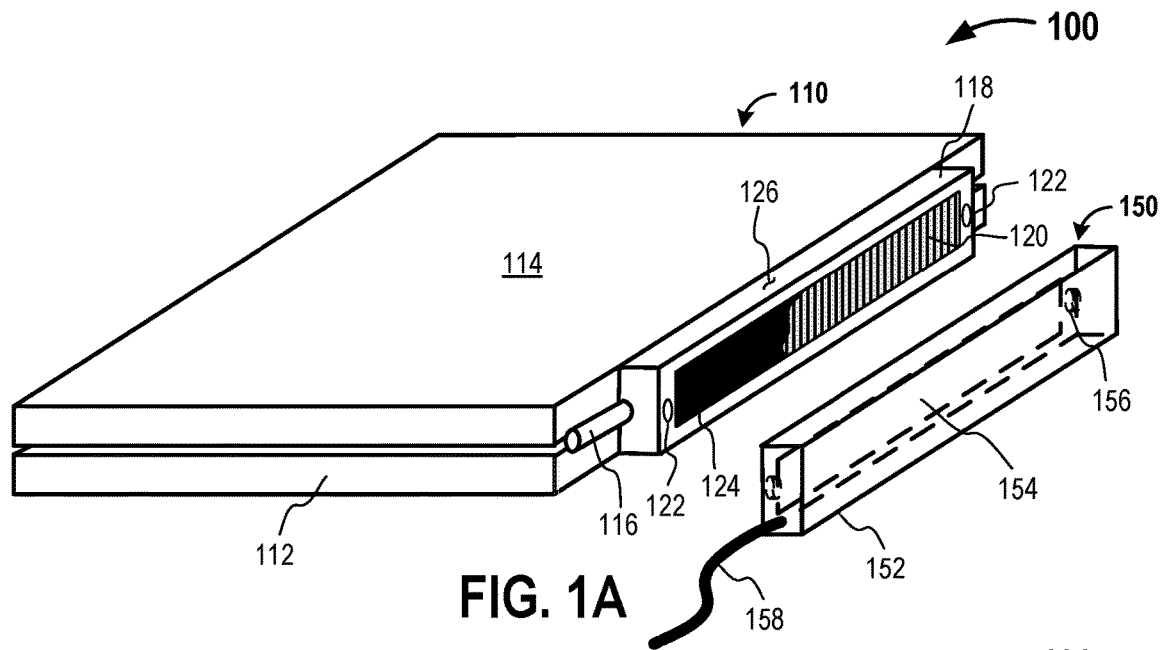
FIG. 1A is a perspective view of an illustrative hinge mounted wireless charging system and a separate power supply member, in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

An electronic device may include at least a first member and a second member that are pivotably coupled via one or more hinges or similar pivotable mechanical couplers. Relocating the wireless charging receiver coil from either the first or the second member to an alternate location external to the respective member permits a corresponding reduction in the overall height of the respective member. Positioning the inductive charging coil(s) in a hinge member disposed proximate the hinges connecting the first member to the second member permits the hinge member to have a height equal to the sum of the thicknesses of the first member and the second member. At times, the hinge member may incorporate the at least one hinge pivotably coupling the first member to the second member to provide a clean, unitized, external appearance to the electronic device. In some implementations, the inductive charging coil may be disposed in, on, or about a hinge synchronization bar that synchronizes the operation of a plurality of hinges pivotably coupling the first member to the second member.

A power supply system for an electronic device is provided. The power supply system may include an electronic device having a plurality of members, each housing at least a portion of the electronic device. The power supply system may further include at least one hinge pivotably coupling at least two of the plurality of members. The power supply system may additionally include at least one hinge member disposed proximate at least one hinge, the hinge member including at least one receiver coil capable of wirelessly receiving energy from at least one power supply coil.

Another power supply system is provided. The power supply system may include at least one receiver coil and at least one energy storage device conductively coupled to the receiver coil. The power supply system may additionally include at least one hinge pivotably coupling a first member to a second member and at least one hinge member disposed proximate the at least one hinge, the at least one hinge member incorporating at least a portion of the at least one receiver coil.

A power supply method is also provided. The power supply method may include pivotably coupling, via at least one hinge, a first member to a second member, disposing a hinge member proximate the at least one hinge; and incorporating at least one receiver coil at least partially in the at least one hinge member, the at least one receiver coil to wirelessly receive energy via an electromagnetic field produced by at least one power supply coil external to the hinge member.

Another power supply system is provided. The power supply system may include a means for pivotably coupling a first member to a second member and a means for carrying at least one receiver coil, the coil carrying means disposed proximate the means for pivotably coupling the first member to the second member, the coil carrying means permitting the at least one receiver coil to wirelessly receive power via an electromagnetic field produced by at least one power supply coil, the at least one power supply coil external to the means for pivotably coupling the first member to the second member.

As used herein, the terms "top" and "bottom" are intended to provide a relative and not an absolute reference to a location. Thus, inverting an object described as having a "top portion" and a "bottom portion" may place the "bottom portion" on the top of the object and the "top portion" on the bottom of the object. Such configurations should be considered as included within the scope of this disclosure.

As used herein, the terms "first," "second," and other similar ordinals are intended to distinguish a number of similar or identical objects and not to denote a particular or absolute order of the objects. Thus, a "first object" and a "second object" may appear in any order—including an order in which the second object appears before or prior in space or time to the first object. Such configurations should be considered as included within the scope of this disclosure.

Figure 1B:
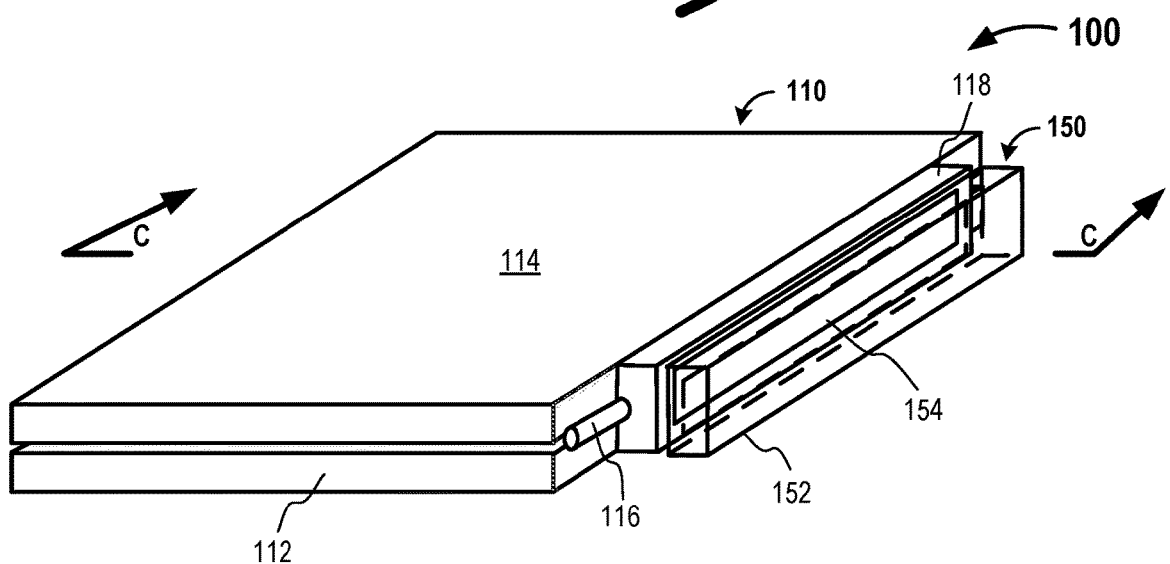
FIG. 1B is a perspective view of the illustrative hinge mounted wireless power system depicted in FIG. 1A with the power supply member disposed proximate the hinge mounted coil, in accordance with at least one embodiment of the present disclosure.
Figure 1C:
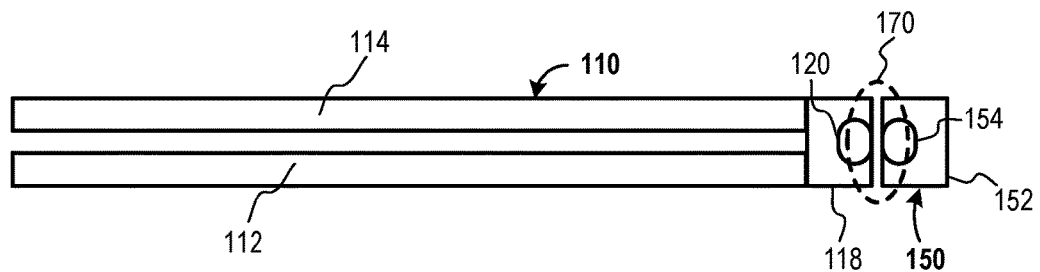
FIG. 1C is a partial cross-section of the illustrative hinge mounted wireless power system depicted in FIG. 1B with the power supply member disposed proximate the hinge mounted coil, in accordance with at least one embodiment of the present disclosure.

FIG. 1A is a perspective view of an illustrative wireless charging system 100 that includes an electronic device 110 having a hinge member 118 that includes at least one receiver coil 120 disposed proximate one or more hinges 116 and a separate power supply 150 having one or more power supply coils 154 disposed such that a wireless transfer of energy between the one or more power supply coils 154 and the at least one receiver coil 120 may occur, in accordance with at least one embodiment of the present disclosure. FIG. 1B is a perspective view of the illustrative wireless charging system 100 depicted in FIG. 1A with the one or more power supply coils 154 in the power supply 150 disposed proximate the at least one receiver coil 120 in the electronic device 110, in accordance with at least one embodiment of the present disclosure. FIG. 1C is a cross-sectional elevation of the illustrative wireless charging system 100 depicted in FIG. 1B along section line C-C, showing the electromagnetic field 170 used to wirelessly transfer energy from one or more power supply coils 154 and at the at least one receiver coil 120, in accordance with at least one embodiment of the present disclosure.

An electronic device 110 may be at least partially disposed within a housing that includes a plurality of members, such as a first member 112 and a second member 114. In some implementations, for example a notebook or ultraportable computer, the first member 112 may include the "base" member of the device 110 that includes components such as a motherboard, central processing unit (CPU), energy storage devices, memory, graphical processing units (GPU), and similar. Although depicted in FIGS. 1A-1C as a first member 112 and a second member 114 for clarity and ease of discussion, any number of members may be similarly pivotably coupled by one or more hinges 116. The first member 112 and the second member 114 may be fabricated using any current or future available metallic material, nonmetallic material, or any combination thereof.

At least one hinge 116 may operably, pivotably, couple the first member 112 to the second member 114. In some implementations, the at least one hinge 116 may be disposed along an edge of the first member 112 and along an edge of the second member 114. In embodiments, the first member 112 and the second member 114 may be pivotably coupled using a plurality of hinges 116. In such embodiments, some or all of the plurality of hinges 116 may be operably coupled using one or more hinge synchronization members that extend between each of the plurality of hinges 116.

At least one hinge member 118 may be disposed proximate the at least one hinge 116. In some implementations, the at least one hinge member 118 may be partially or completely hollow. The at least one hinge member 118 may have any size, shape, or physical configuration. In some implementations all or a portion of one or more hinge synchronization members may extend through a hollow hinge member 118. In some implementations, the at least one hinge member 118 may include, incorporate, cover, or otherwise obscure all or a portion of the at least one hinge 116. In embodiments, the at least one hinge member 118 may include one or more recesses or apertures to accommodate the insertion of the at least one receiver coil 120. The at least one hinge member 118 may be disposed proximate an edge of the first member 112, an edge of the second member 114, or both an edge of the first member 112 and an edge of the second member 114.

A first portion 124 of the at least one hinge member 118 may be fabricated at least in part using one or more materials or include one or more structures or components that are at least partially transparent to or transmissive of electromagnetic fields 170 such as the electromagnetic field(s) 170 generated by the one or more power supply coils 154 and used to wirelessly transfer energy to the at least one receiver coil 120. In some implementations, the entire hinge member 118 may be fabricated in its entirety using one or more materials that are at least partially transparent to electromagnetic fields 170. Non-limiting examples of such materials transparent to electromagnetic radiation 124 may include, but are not limited to, one or more thermoplastic or thermosetting polymers. A second portion 126 the hinge member 118 may be fabricated using one or more materials or include one or more structures or components that are at least partially opaque to electromagnetic fields 170.

A second portion of the at least one hinge member 118 may be fabricated at least in part using one or more materials at least partially opaque to or not transmissive of electromagnetic fields 170 such as the electromagnetic field(s) 170 generated by the one or more power supply coils 154 and used to wirelessly transfer energy to the at least one receiver coil 120. Non-limiting examples of such materials may include, but are not limited to, aluminum and aluminum containing alloys.

The one or more materials opaque to electromagnetic radiation 126 may, at times, include one or more electrically conductive materials. In some implementations the at least one hinge member 118 may include one or more electrically conductive materials that are electrically conductively coupled to a chassis ground or to an earth ground. In some implementations, such electromagnetically opaque material 126 and/or electrically conductive portions of the at least one hinge member 118 may be positioned proximate or adjacent to at least one of the first member 112 or the second member 114. By fabricating the at least one hinge member 118 using an electromagnetically opaque material 126 and/or an electrically conductive material and positioning the at least one hinge member 118 such that the electromagnetically opaque and/or an electrically conductive material is proximate the first member 112 and/or the second member 114, electromagnetic interference with the electronic components disposed within the first member 112 and/or the second member 114 may be beneficially reduced or even eliminated.

At least one receiver coil 120 may be disposed in, on, or about the at least one hinge member 118. The at least one receiver coil 120 may include any number of coils disposed in, on, or about the at least one hinge member 118. For example, the at least one receiver coil 120 may include a plurality of coils, each having an equal or unequal number of turns disposed at regular or irregular intervals in, on, or about the at least one hinge member 118. The at least one receiver coil 120 may include, but is not limited to, at least one high aspect ratio receiver coil 120 in which the height or length of the at least one receiver coil 120 is greater than about 2 times; about 3 times; about 5 times; about 7 times; or about 10 times the diameter of the respective coil. When placed in an electromagnetic field 170 produced by one or more power supply coils 154, the at least one receiver coil 120 may wirelessly receive energy using any current or future developed wireless energy transfer system or method including, but not limited to, loosely-coupled electromagnetic charging, inductive coupling or magnetic resonance coupling.

In some implementations, the at least one receiver coil 120 may be disposed partially or completely within a hollow or partially hollow hinge member 118. In some implementations, the at least one receiver coil 120 may be disposed at least partially on an exterior surface of the hinge member 118. In some implementations, the at least one receiver coil 120 may be disposed at least partially within an aperture or recess formed in the surface of the hinge member 118. In some implementations, all or a portion of the energy received via the at least one receiver coil 120 may be used in whole or in part by one or more electronic devices, modules, systems, subsystems, or components disposed in the first member 112, the second member 114, or any combination thereof. In some implementations, all or a portion of the energy wirelessly received by the at least one receiver coil 120 may be stored for future use in one or more energy storage devices such as one or more lithium-ion batteries, one or more nickel-metal hydride batteries, one or more ultra-capacitors, one or more supercapacitors, or any combination thereof.

Power transfer in wireless energy transfer systems may be increased or maximized when the one or more power supply coils 154 disposed in, on, or about the power supply 150 are aligned with the at least one receiver coil 120 disposed in, on, or about the electronic device. One or more alignment features 122 may be disposed proximate the at least one receiver coil 120 to facilitate the alignment of the at least one receiver coil 120 in the electronic device 110 with the one or more power supply coils 154 in the power supply module 150. In embodiments, the one or more alignment features 122 may include one or more magnetic alignment features 122 attracted to corresponding alignment features 156 disposed in the power supply 150. In embodiments, the one or more alignment features 122 may include one or more protruding alignment features 122 (e.g., pins) or one or more recessed alignment features 122 (e.g., sockets) that physically couple to a corresponding alignment feature 156 disposed on the power supply 150.

The power supply 150 includes one or more power supply coils 154 disposed at least partially within a housing 152. The one or more power supply coils 154 may receive power from one or more external sources 158, such as a wall outlet or power supply "brick." When energized, the one or more power supply coils 154 generate an electromagnetic field 170 that extends outwardly from the one or more power supply coils 154. In some implementations, the electromagnetic field 170 may extend from the one or more power supply coils 154 only a short distance (e.g., a fraction of the diameter of the at least one coil 120) for example when energy is transferred to the at least one coil 120 via inductive coupling. In other implementations, the electromagnetic field 170 may extend from the one or more power supply coils 154 for an extended distance (e.g., 1 to 20 diameters of the at least one coil 120), for example when energy is transferred to the at least one coil 120 via resonant inductive coupling or magnetically resonant coupling. Regardless of the wireless energy transfer technology, when the inductive charging coil 118 disposed in an electronic device 110 is brought within range of the electromagnetic field 170 produced by the one or more power supply coils 154, energy is wirelessly transferred to the at least one coil 120.

In some implementations, the power supply housing 152 may include a base or other support structure for the electronic device 110. In such embodiments, the power supply housing 152 may be attached, detachably attached, affixed, or formed integral with the base or support structure. In other implementations, the power supply housing 152 may include only a member that attaches to the electronic device 110. In such embodiments, the power supply housing 152 may include a bar-like member that includes the one or more power supply coils 154.

The power supply housing 152 may include one or more devices and/or structures that at least partially enclose the power supply coil 154. In embodiments, the power supply housing 152 may additionally include systems, devices, and/or components such as one or more docking interfaces for unidirectional or bidirectional communication with the electronic device 110, one or more input ports, one or more output ports, power supplies, power transformers, and similar. In some instances, the power supply housing 152 may include one or more controls and/or user interfaces to selectively enable one or more power supply coils 154 when the power supply 150 includes a plurality of power supply coils 154. In some instances, the power supply housing 152 may include one or more controls and/or user interfaces to selectively power to flow through all or a portion of the power supply coils 154.

The one or more power supply coils 154 can include any number and/or combination of power supply coils 154. In embodiments, the power supply housing 152 may be at least partially hollow and some or all of the one or more power supply coils 154 may be disposed at least partially within the hollow power supply housing 152. In embodiments, some or all of the one or more power supply coils 154 may be at least partially disposed on an exterior surface of the power supply housing 152. In embodiments, some or all of the one or more power supply coils 154 may be disposed at least partially in or about an aperture or recess formed in one or more exterior surfaces of the power supply housing 152.

The power supply 150 may include one or more alignment features 156 disposed proximate the at power supply coils 154. In embodiments, the one or more alignment features 156 may be disposed at least partially within the power supply housing 152. In embodiments, the one or more alignment features 156 may be disposed at least partially on one or more external surfaces of the power supply housing 152. The one or more alignment features 156 may assist in aligning the one or more power supply coils 154 with the at least one coil 122 carried by the electronic device 110. In embodiments, the one or more alignment features 156 may include one or more magnetic alignment features 156 that are attracted to corresponding alignment features 122 disposed in the electronic device 110. In embodiments, the one or more alignment features 156 may include one or more protruding alignment features 156 (e.g., pins) or one or more recessed alignment fixtures 156 (e.g., sockets) that physically couple to a corresponding alignment feature 122 disposed in, on, or about the electronic device 110.

Figure 2:
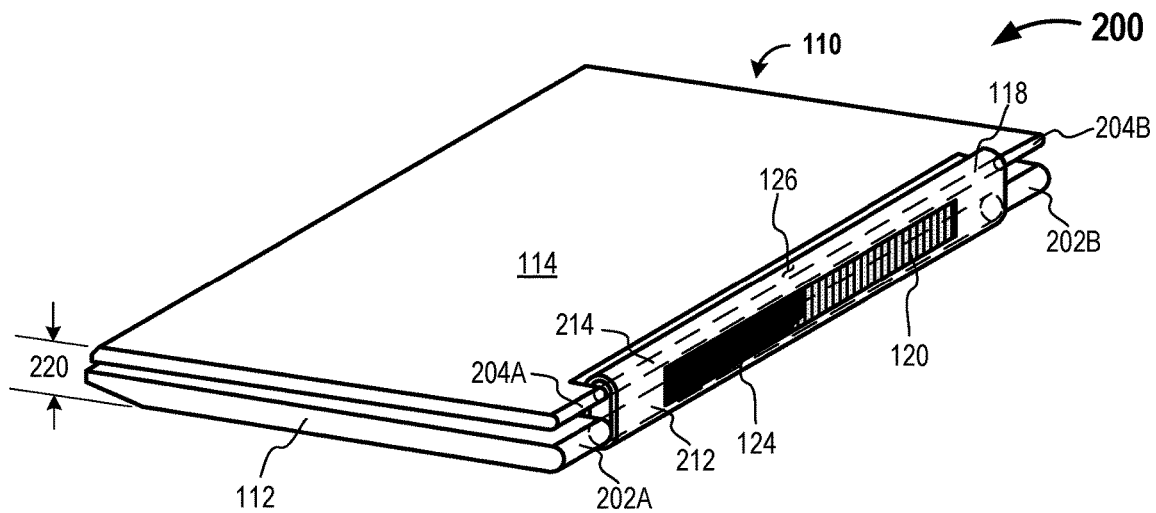
FIG. 2 is a perspective view of another illustrative hinge mounted wireless power system 200, in accordance with at least one embodiment of the present disclosure. As depicted

FIG. 2 is a perspective view of another illustrative hinge mounted wireless energy transfer system 200, in accordance with at least one embodiment of the present disclosure. As depicted in FIG. 2, the first member 112 includes a pair of hinges 202A and 202B operably coupled by a synchronization member 212 that passes at least partially through the hinge member 118. Also as depicted in FIG. 2, the second member 114 includes a pair of hinges 204A and 204B operably coupled by a synchronization member 214 that passes at least partially through the hinge member 118. The at least one receiver coil 120 is disposed at least partially within the hinge member 118. As depicted in FIG. 2, the hinge member 118 is positioned vertically and when located within an electromagnetic field 170 produced by the one or more power supply coils 154, may wirelessly couple to the one or more power supply coils 154 carried by an external power supply member 150. In at least some implementations, the external power supply member 150 may include any number of similar, vertically oriented, power supply coils 154.

Beneficially, for manufacturing, the same first member 112 and second member 114 may be pivotably coupled using either a hinge member 118 that includes the at least one receiver coil 120 or a blank hinge member 118 from which the at least one receiver coil 120 has been excluded. This advantageously permits the manufacture of electronic devices 110 having wireless energy transfer systems side-by-side with electronic devices 110 from which wireless energy transfer systems have been deleted. The placement of the at least one receiver coil 120 in, on, or about the hinge member 118 and along the "spine" of the electronic device 110 beneficially removes the wireless energy transfer system from the height 220 of the "stack" formed by the first member 112 and the second member 114, thereby permitting a thinner profile for the electronic device 110.

Figure 3A:
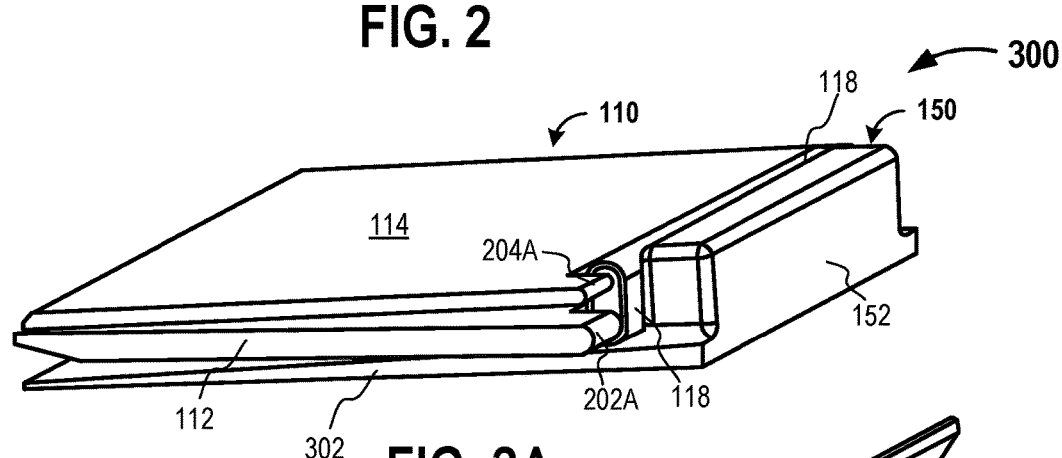
FIG. 3A is a perspective view of an illustrative system in which the at least one coil in an electronic device is wirelessly coupled to the one or more power supply coils in a power supply, in accordance with at least one embodiment of the present disclosure.
Figure 3B:
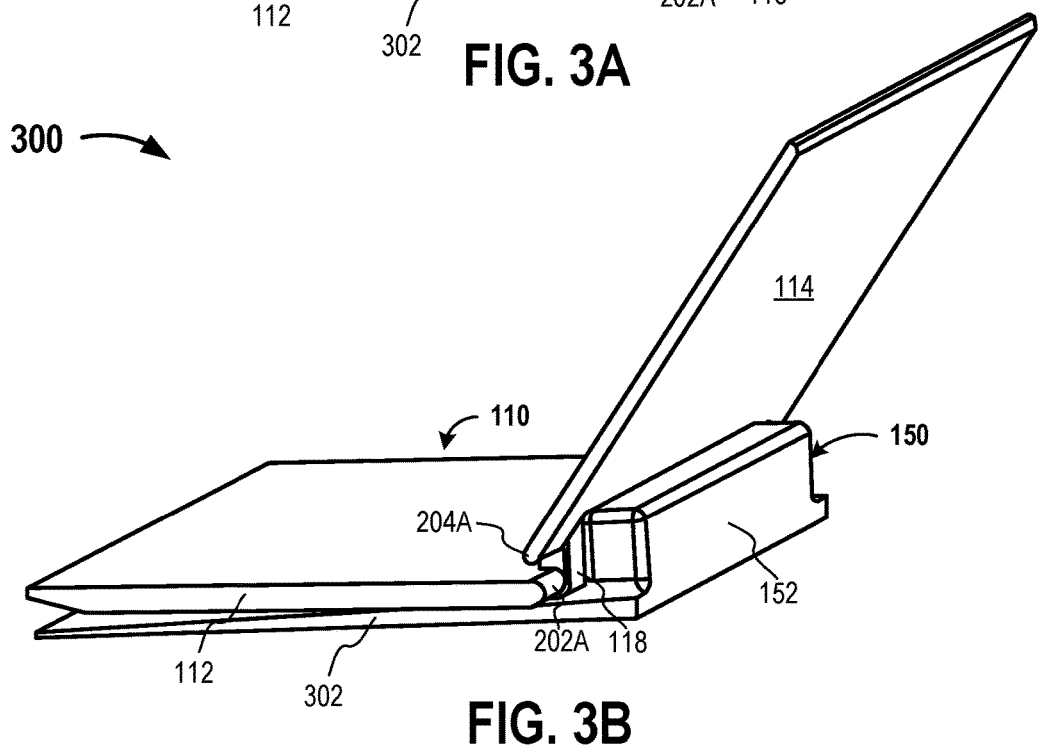
FIG. 3B is a perspective view of the illustrative system depicted in FIG. 3A with the electronic device disposed in an open or operating configuration while the at least one coil in an electronic device remains wirelessly coupled to the one or more power supply coils in a power supply, in accordance with at least one embodiment of the present disclosure.

FIG. 3A is a perspective view of an illustrative system 300 in which the at least one receiver coil 120 in an electronic device 110 is wirelessly coupled to the one or more power supply coils 154 in a power supply 150, in accordance with at least one embodiment of the present disclosure. FIG. 3B is a perspective view of the illustrative system 300 depicted in FIG. 3A with the electronic device 110 disposed in an open or operating configuration while the at least one receiver coil 120 in an electronic device 110 remains wirelessly coupled to the one or more power supply coils 154 in a power supply 150, in accordance with at least one embodiment of the present disclosure. As depicted in FIGS. 3A and 3B, the power supply 150 is formed integral with a base member 302 upon which the electronic device 110 may be placed. When the electronic device 110 is placed on the base member 302, the at least one receiver coil 120 disposed in, on, or about the hinge member 118 aligns with the one or more power supply coils 154 disposed in, on, or about the power supply 150. In at least some implementations, one or more alignment features 122 disposed in, on, or about the electronic device 110 and one or more alignment features 156 disposed in, on, or about the power supply 150 may facilitate the alignment of the at least one receiver coil 120 with the one or more power supply coils 154. As depicted in FIG. 3B, in embodiments, the electronic device 110 may be transitioned from a first state (e.g., a closed, standby, or OFF state) to a second state (e.g., an open, operational, or ON state) while the electronic device 110 remains wirelessly coupled to the power supply member 150 by virtue of the placement of the hinge member 118 and the at least one coil 120 in the electromagnetic field 170 produced by the one or more power supply coils 154.

Figure 4A:
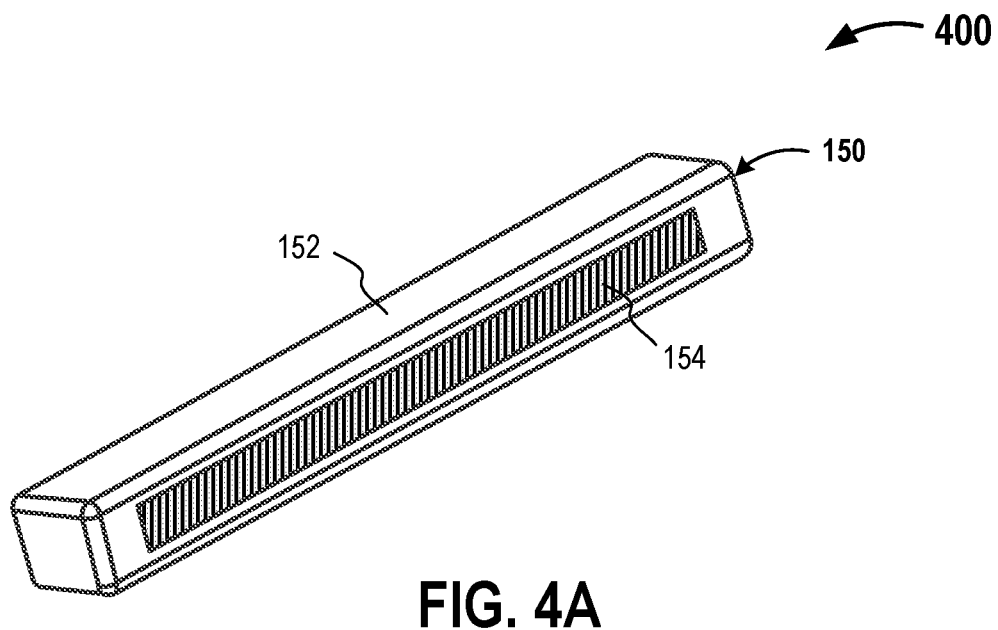
FIG. 4A is a perspective view of an illustrative power supply that includes a single, high aspect, power supply coil, in accordance with at least one embodiment of the present disclosure.
Figure 4B:
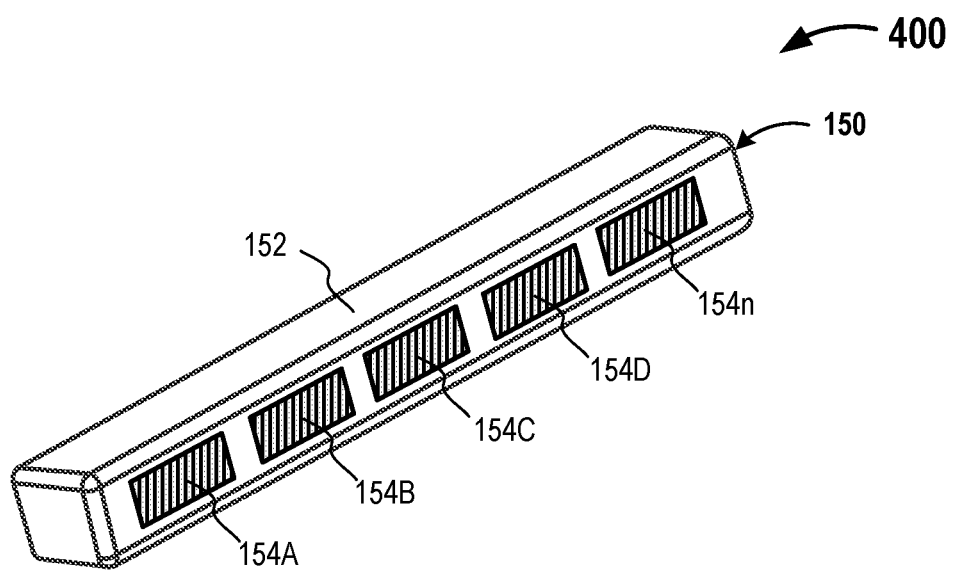
FIG. 4B is a perspective view of another illustrative power supply that includes a number of power supply coils, in accordance with at least one embodiment of the present disclosure.

FIG. 4A is a perspective view of an illustrative power supply 150 that includes a single, high aspect, power supply coil 154, in accordance with at least one embodiment of the present disclosure. FIG. 4B is a perspective view of another illustrative power supply 150 that includes a number of power supply coils 154A-154n, in accordance with at least one embodiment of the present disclosure. The power supply 150 may have any number of power supply coils 154. The power supply 150 depicted in FIG. 4A includes a single, high-aspect, power supply coil 154. The power supply 150 depicted in FIG. 4B includes a number of power supply coils 154A-154n. In some implementations, the electromagnetic field 170 produced by each of the number of power supply coils 154A-154n may be individually controlled by one or more circuits, processors, or controllers disposed in whole or in part in the power supply 150.

Figure 5:
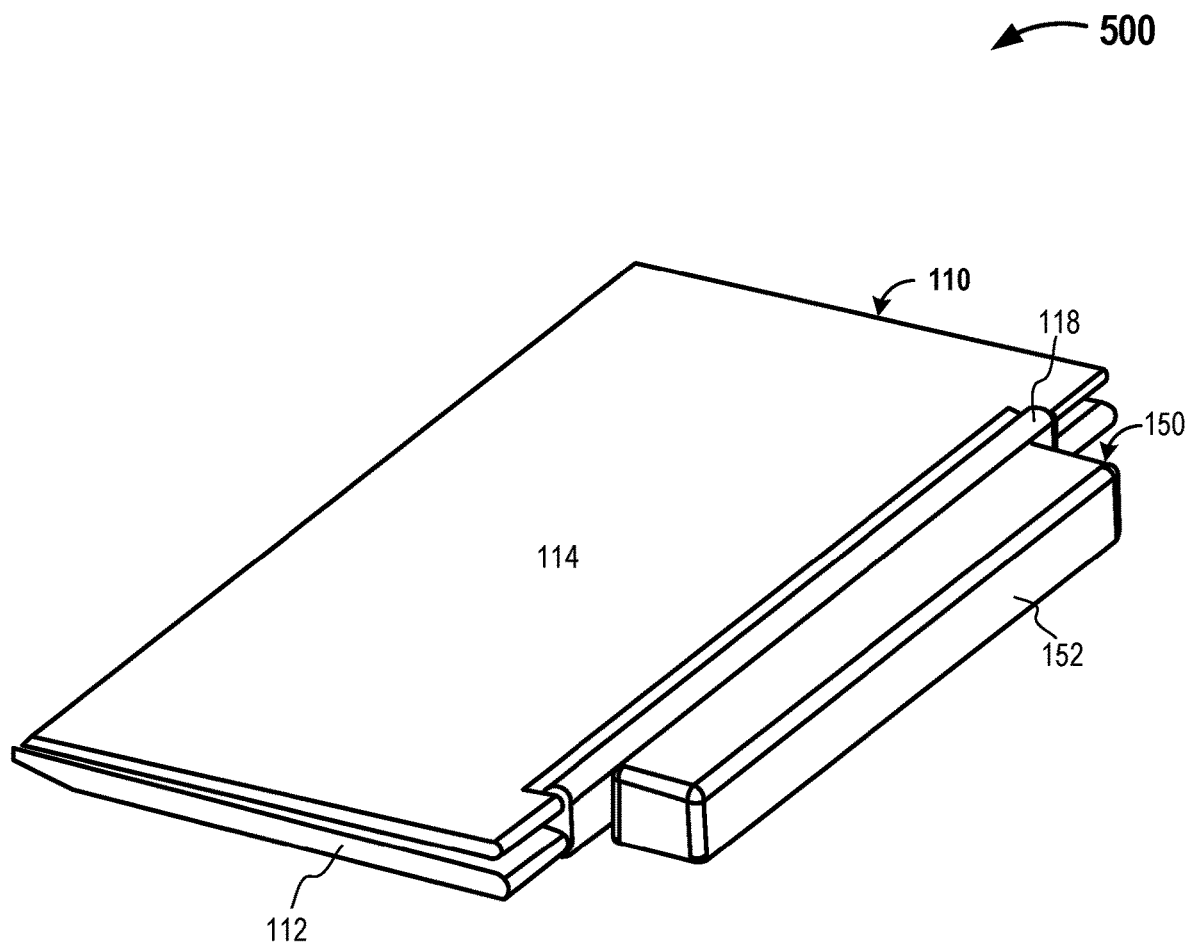
FIG. 5 is a perspective view of an illustrative wireless power system in which at least one coil disposed in, on, or about an electronic device is wirelessly coupled to one or more power supply coils disposed in, on, or about a power supply, in accordance with at least one embodiment of the present disclosure.

FIG. 5 is a perspective view of an illustrative wireless power system 500 in which at least one receiver coil 120 disposed in, on, or about an electronic device 110 may wirelessly receive energy via an electromagnetic field 170 produced by one or more power supply coils 154 disposed in, on, or about a power supply 150, in accordance with at least one embodiment of the present disclosure. In at some implementations, the power supply 150 may be at least partially enclosed in a bar-shaped housing 152 that may be physically coupled to the electronic device 110 such that the at least one coil 122 and the one or more power supply coils 154 are aligned.

Figure 6:
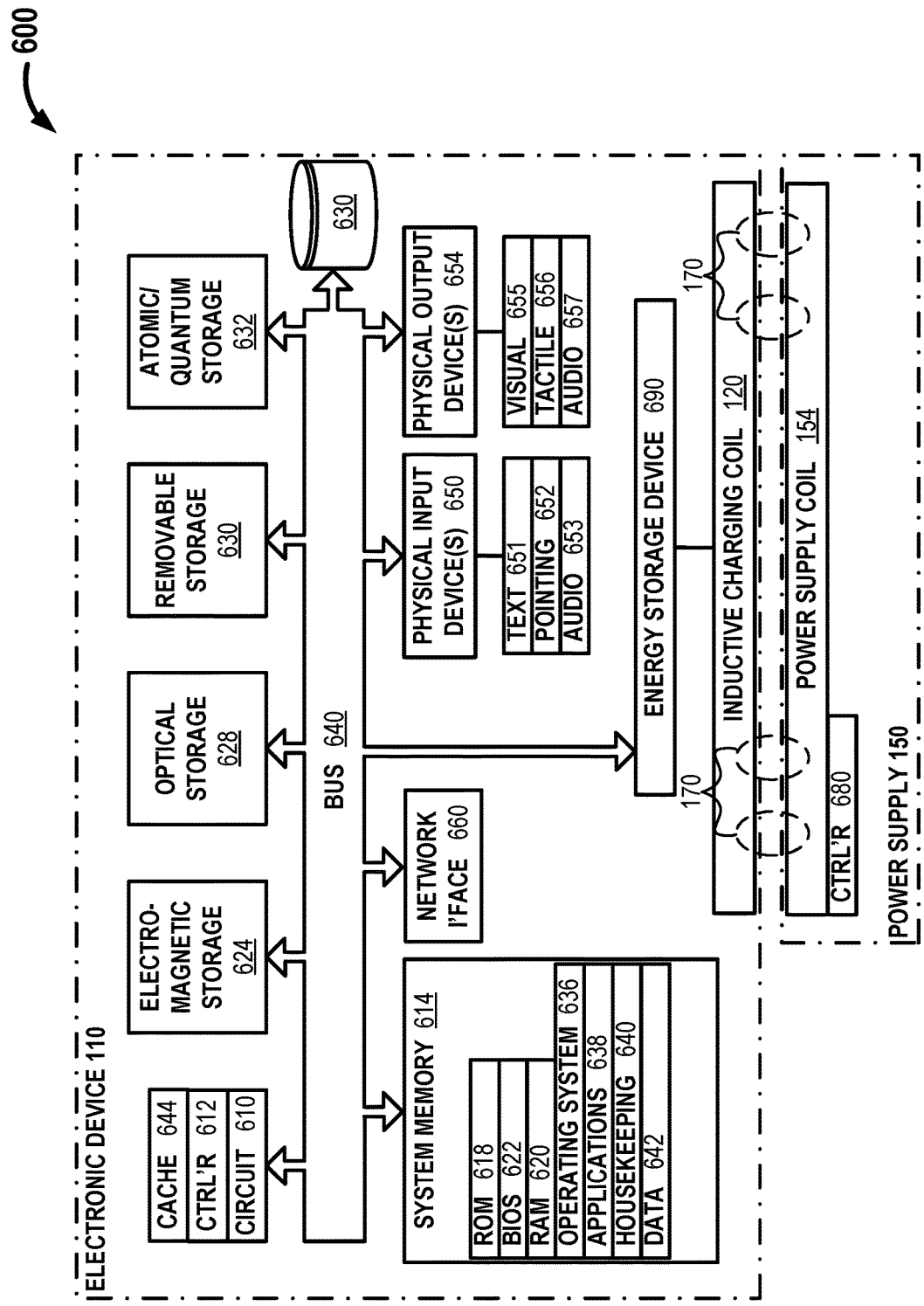
FIG. 6 is a block diagram of an illustrative electronic device wirelessly coupled to an illustrative power supply, in accordance with at least one embodiment of the present disclosure.

FIG. 6 and the following discussion provide a brief, general description of the components forming an illustrative system 600 that includes an electronic device 110 and an inductively coupleable power supply 150 as described in detail above with regard to FIGS. 1A-1C, FIG. 2, FIGS. 3A-3B, FIGS. 4A-4B, and FIG. 5, in accordance with at least one embodiment of the present disclosure. Although not required, some portion of the embodiments will be described in the general context of machine-readable or computer-executable instruction sets, such as program application modules, objects, or macros being executed by the system 600. Those skilled in the relevant art will appreciate that the illustrated embodiments as well as other embodiments can be practiced with other circuit-based device configurations, including portable electronic or handheld electronic devices, for instance smartphones, portable computers, wearable computers, microprocessor-based or programmable consumer electronics, personal computers ("PCs"), network PCs, minicomputers, and the like.

The system 600 includes one or more circuits 610, and may include one or more conductors or buses 640 that communicably couple and/or distribute power to various system components including a system memory 614, a network interface 660, input devices 650, output devices 654, and various storage devices/storage media disposed within the electronic device 110. In embodiments, the one or more conductors 604 that interconnect at least some of the system components may employ any known bus structures or architectures. The one or more circuits 610 may execute one or more sets of machine-readable instructions that cause the one or more circuits to provide a specialized or particular wireless charging controller 612. The wireless charging controller 612 may include any number, type, or combination of devices. At times, the wireless charging controller 612 may be implemented in whole or in part in the form of semiconductor devices such as diodes, transistors and electrical components such as inductors, capacitors, and resistors. Such an implementation may include, but is not limited to any current or future developed single- or multi-core processor or microprocessor, such as: one or more systems on a chip (SOCs); central processing units (CPUs); digital signal processors (DSPs); graphics processing units (GPUs); application-specific integrated circuits (ASICs), field programmable gate arrays (FPGAs), and the like. In embodiments, the wireless charging controller 612 may be implemented in whole or in part as a hardwired circuit. In embodiments, the wireless charging controller 612 may be implemented in whole or in part using one or more multi-purpose processors, microprocessors, controllers, or similar. Unless described otherwise, the construction and operation of the various blocks shown in FIG. 6 are of conventional design. As a result, such blocks need not be described in further detail herein, as they will be understood by those skilled in the relevant art.

The system memory 614 may include read-only memory ("ROM") 618 and random access memory ("RAM") 620. A portion of the ROM 618 may contain a basic input/output system ("BIOS") 622. The BIOS 622 may provide basic system functionality, for example by causing the one or more circuits to load the machine-readable instruction sets that cause at least a portion of the one or more circuits 610 to provide the functionality of the wireless charging controller 612. The system 600 may include one or more communicably coupled current or future developed storage devices that include, but are not limited to, one or more electro-magnetic storage devices 624, optical storage devices 628, solid-state electromagnetic storage devices 630, atomic or quantum storage devices 632, or combinations thereof.

The system memory 614 may include any number of interfaces or controllers (not shown) that communicably couple the respective storage device or system to the one or more conductors or buses 640, as is known by those skilled in the art. In some implementations, one or more storage devices 630 may contain machine-readable instruction sets, data structures, program modules, and other data useful to the wireless charging controller 612. In some instances, one or more network interfaces 660 may also provide the electronic device 110 with the capability to unidirectionally or bidirectionally communicate with one or more external devices via one or more local area networks (LANs); wide area networks (WANs); worldwide area networks (WWANs); or any combination thereof.

Machine-readable instruction sets 638 and housekeeping data and/or instruction sets 640 may be stored in whole or in part in the system memory 614. Such instruction sets 638, 640 may be transferred from the one or more storage devices 630 and stored in the system memory 614 in whole or in part for execution by the wireless charging controller 612. The machine-readable instruction sets 638 may include one or more instruction sets capable of providing the selective inductive charging capabilities described herein.

For example, one or more machine-readable instruction sets 638 may cause the wireless charging controller 612 to alter or adjust the current flow through the one or more power supply coils 154 responsive to one or more conditions within the electronic device 110. For example, a high temperature condition in the energy storage device 690 may cause the wireless charging controller 612 to temporarily or permanently adjust downward the current flow through the one or more power supply coils 154.

System users may provide, enter, or otherwise supply information and/or commands (e.g., defined object selection criterion) to the system 600 using one or more communicably coupled physical input devices 650 such as a text entry device 651 (e.g., keyboard), pointer 652 (e.g., mouse, touchscreen), or audio 653 input device. In some implementations, some or all of the physical input devices 650 may be physically and communicably coupled to the first member 112. System users may receive output generated, at least in part, by the inductive charging controller 612 via one or more physical output devices 654. In at least some implementations, the physical output devices 654 may include, but are not limited to, one or more visual display devices 655; one or more tactile output devices 656; one or more audio output devices 658, or combinations thereof.

For convenience, the network interface 660, the circuit 610, the wireless charging controller 612, the system memory 614, the physical input devices 650 and the physical output devices 654 are illustrated as communicatively coupled to each other via the one or more conductors or via a bus 640, thereby providing connectivity between the above-described components. In alternative embodiments, the above-described components may be communicatively coupled in a different manner than illustrated in FIG. 6. For example, one or more of the above-described components may be directly coupled to other components, or may be coupled to each other, via one or more intermediary components (not shown). In some embodiments, all or a portion of the one or more conductors or buses 640 may be omitted and the components are coupled directly to each other using suitable wired or wireless connections.

In some implementations, the electronic device 110 may be powered in whole or in part using one or more energy storage devices 690. Illustrative examples of such energy storage devices 690 may include, but are not limited to, any current or future developed battery technology (lithium ion, nickel/metal hydride, thin-film lithium, etc.); any current or future developed super capacitor technology; or any current or future developed ultra-capacitor technology. The one or more energy storage devices 690 may receive some or all of the incoming energy from the at least one receiver coil 120 disposed in, on, or about the hinge member 118.

The at least one receiver coil 120 disposed in, on, or about the electronic device 110 may wirelessly couple to some or all of the one or more power supply coils 154 disposed in, on, or about the power supply 150 when current flows through the one or more power supply coils 154. In some implementations, one or more power supply controllers 680 may be disposed in, on, or about the power supply 150. The one or more power supply controllers 680 may alter, control, or adjust one or more operational parameters of the power supply 150 including, but not limited to, the current flow through some or all of the one or more power supply coils 154, the number of energized power supply coils 154, or combinations thereof. In some implementations, one or more tethered or wireless communications links may be exist between the wireless charging controller 612 and the one or more power supply controllers 680. Providing communications capabilities between the wireless charging controller 612 and the one or more power supply controllers 680 may advantageously control the quantity of energy and/or the rate of energy transfer between the at least one receiver coil 120 and the one or more power supply coils 154 via the electromagnetic field 170 coupling the at least one receiver coil 120 to the one or more power supply coils 154.

Figure 7:
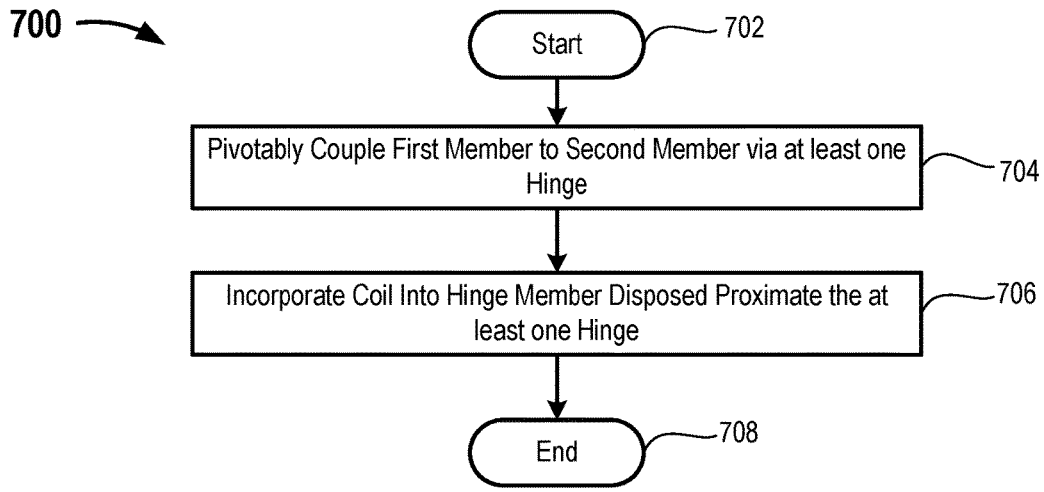
FIG. 7 is a high-level logic flow diagram of an illustrative energy transfer method in which energy is wirelessly transferred between at least one coil disposed in, on, or about a hinge member of an electronic device and one or more power supply coils disposed in, on, or about a power supply member, in accordance with at least one embodiment of the present disclosure.

FIG. 7 is a high-level logic flow diagram of an illustrative wireless energy transfer method 700 in which energy is wirelessly transferred between one or more power supply coils 154 disposed in, on, or about a power supply member 152 and at least one receiver coil 120 disposed in, on, or about a hinge member 118 of an electronic device 110, in accordance with at least one embodiment of the present disclosure. Many electronic devices 110 use a "clamshell" design in which a first member 112 and a second member 114 are pivotably coupled via one or more hinges 116. At least some of these electronic devices 110 include a hinge member 118 that forms a decorative design of the electronic device as a whole, a functional portion of the electronic device, or both. In a "clamshell" design, the height of the hinge member 118 may be equal to or greater than the combined thicknesses of the first member 112 and the second member 114. Advantageously, the increased height offered by the hinge member 118 may be used to house the at least one receiver coil 120 that may be used in conjunction with a number of power supply coils 154 to wirelessly provide energy to the electronic device 110. Beneficially, by housing the at least one receiver coil 120 in the hinge member 118, it may be possible to reduce the thickness of either or both the first member 112 and the second member 114. The method 700 commences at 702.

At 704, at least one hinge 116 may be used to pivotably couple a first member 112 to a second member 114. In at least some implementations, the first member 112 and the second member 114 form a "clamshell" electronic device 110. Example clamshell electronic devices 110 may include, but are not limited to, notebook computers, laptop computers, portable computers, Chrome® books, netbooks, smartphones, and similar. In some implementations, the at least one hinge 116 may include at least one hinge 202A disposed proximate the first member 112 and at least one hinge 202B disposed proximate the second member 114.

At 706, at least one receiver coil 120 may be disposed in, on, or about a hinge member 118. In some implementations, a first portion 124 of the hinge member 118 may be formed from a material that is at least partially transparent to or permits the passage of some or all of the electromagnetic field 170 produced by the power supply coils 154. In some implementations, the first portion 124 of the hinge member 118 may be disposed proximate the at least one receiver coil 120 carried by the hinge member 118. In some implementations, a second portion 126 of the hinge member 118 may be formed using a material that is at least partially opaque to or prevents the passage of some or all of the electromagnetic field 170 produced by the power supply coils 154.

In some implementations, the hinge member 118 may be partially or completely hollow and the at least one receiver coil 120 may be disposed partially or completely within the hollow hinge member 118. In other implementations, the at least one receiver coil 120 may be disposed partially or completely on an exterior surface of the hinge member 118. In other implementations, the at least one receiver coil 120 may be disposed partially or completely in, on, or about an aperture or recessed area on an exterior surface of the hinge member 118.

The at least one hinge member 118 may be disposed proximate the at least one hinge 116. In some implementations, the at least one hinge member 118 may be a partially or completely hollow member and a hinge synchronization member may be routed through at least a portion of the hinge member 118 to synchronize the rotation of the at least one hinge member 116.

Where multiple hinges are used, the at least one hinge member 118 may be disposed proximate hinges 202A and 202B affixed to the first member 112 and proximate hinges 204A and 204B affixed to the second member 114. In such multiple hinge implementations, the at least one hinge member 118 may be a partially or completely hollow member and a first hinge synchronization member 212 may be routed through at least a portion of the hinge member 118 to synchronize the rotation of hinges 202A and 202B affixed to the first member 112. Additionally or alternatively, a second hinge synchronization member 214 may be routed through at least a portion of the hinge member 118 to synchronize the rotation of hinges 204A and 204B affixed to the second member 114. The method 700 concludes at 708/

Figure 8:
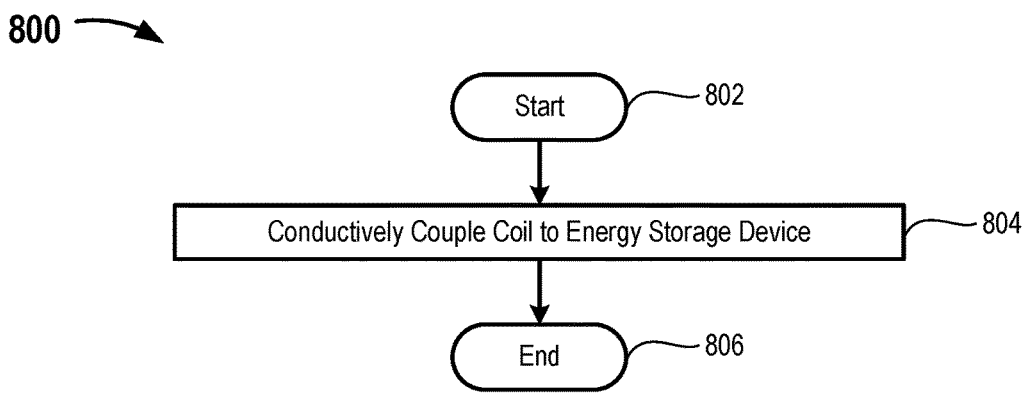
FIG. 8 is a high-level logic flow diagram of an illustrative method of coupling one or more energy storage devices to the at least one coil such that at least a portion of the energy received by the at least one coil may be stored by the one or more energy storage devices, in accordance with at least one embodiment of the present disclosure.

FIG. 8 is a high-level logic flow diagram of an illustrative method 800 of coupling one or more energy storage devices 690 to the at least one receiver coil 120 such that at least a portion of the energy received by the at least one receiver coil 120 may be stored by the one or more energy storage devices 690, in accordance with at least one embodiment of the present disclosure. The method 800 commences at 802.

At 804, the at least one receiver coil 120 may be electrically conductively coupled to one or more energy storage devices 690 carried by the electronic device 110. Examples of energy storage devices 690 may include, but are not limited to, one or more lithium ion batteries, one or more lithium film batteries, one or more nickel-metal hydride batteries, one or more supercapacitors, one or more ultracapacitors, or any combination thereof. The method 800 concludes at 806.

Figure 9:
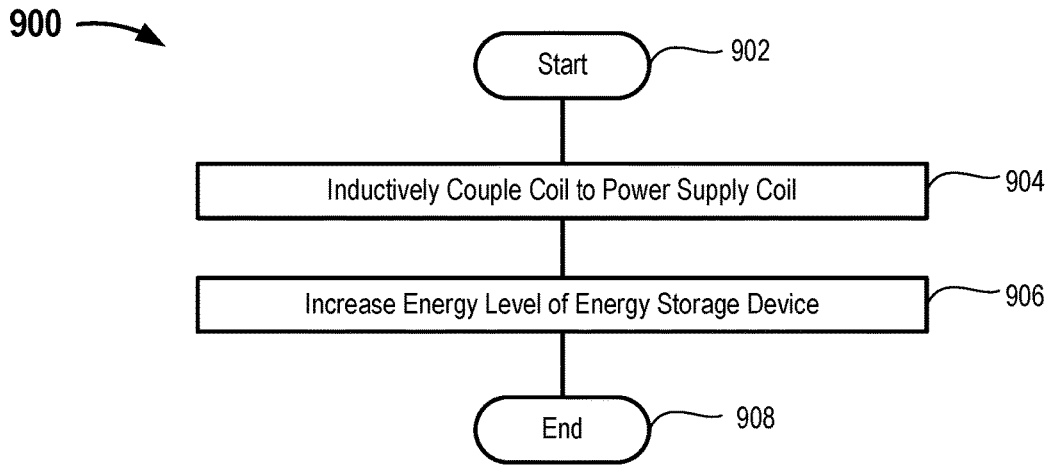
FIG. 9 is a high-level logic flow diagram of an illustrative method of wirelessly transferring energy from one or more power supply coils to the at least one coil and storing at least a portion of the energy received by the at least one coil in an energy storage device carried by the electronic device, in accordance with at least one embodiment of the present disclosure.

FIG. 9 is a high-level logic flow diagram of an illustrative method 900 of wirelessly coupling the at least one receiver coil 120 to one or more power supply coils 154 and storing at least a portion of the energy received by the at least one receiver coil 120 in an energy storage device 690 carried by the electronic device 110, in accordance with at least one embodiment of the present disclosure. Flowing current through the one or more power supply coils 154 creates an electromagnetic field 170. Aligning the at least one receiver coil 120 with the one or more power supply coils 154 and causes a transfer of energy from the electromagnetic field 170 to the at least one receiver coil 120. The electronic device may use all or a portion of the energy received by the at least one receiver coil 120 for one or more purposes. The method 900 commences at 902.

At 904, the at least one receiver coil 120 may wirelessly couple to the one or more power supply coils 154. The at least one receiver coil 120 may receive at least a portion of the energy provided by the power supply 150 via the electromagnetic field 170 produced by the one or more power supply coils 154.

At 906, at least a portion of the energy received by the at least one receiver coil 120 may be stored in one or more energy storage devices 690 that are electrically conductively coupled to the at least one receiver coil 120. The method 900 concludes at 908.

Figure 10:
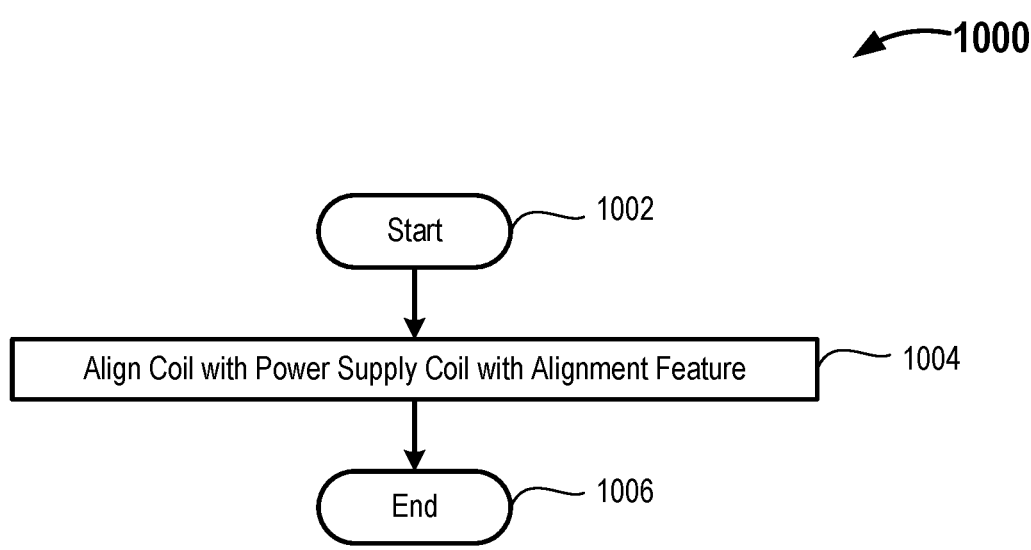
FIG. 10 is a high-level logic flow diagram of an illustrative method of aligning at least one coil carried by an electronic device with one or more coils carried by a power supply to improve the transfer of energy between the at least one coil and the one or more coils, in accordance with at least one embodiment of the present disclosure.

FIG. 10 is a high-level logic flow diagram of an illustrative method 1000 of aligning at least one receiver coil 120 carried by an electronic device 110 with one or more coils 154 carried by a power supply 150 to improve the wireless transfer of energy between the at least one receiver coil 120 and the one or more coils 154, in accordance with at least one embodiment of the present disclosure. The transfer of energy between the at least one receiver coil 120 carried by the electronic device 110 and the one or more power supply coils 154 carried by the power supply 150 may be affected by the positioning of the coils with respect to each other. The method 1000 commences at 1002.

At 1004, the at least one receiver coil 120 may be aligned with the one or more power supply coils 154 to maximize the transfer of energy between the coils 120, 154 via a wireless coupling 170 between the coils 120, 154. In some implementations, one or more alignment features 122 may be disposed in, on, or about the electronic device 110 and one or more corresponding alignment features 156 may be disposed in, on, or about the power supply 150. Such alignment features 122, 156 may include one or more pins and sockets or one or more sets of magnetic members. The method 1000 concludes at 1006.

The following examples pertain to further embodiments. The following examples of the present disclosure may comprise subject material such as devices, systems, and methods that wirelessly couple at least one receiver coil 120 disposed in, on, or, about a hinge member 118 to one or more power supply coils 154 disposed in, on, or about a power supply 150.

According to example 1 there is provided a power supply system for an electronic device. The system may include an electronic device having a plurality of members, each of the members housing at least a portion of the electronic device. The system may further include a hinge pivotably coupling at least two of the plurality of members. The system may additionally include a hinge member disposed proximate the hinge, the hinge member including a receiver coil capable of wirelessly receiving energy from a power supply coil.

Example 2 may include elements of example 1 where the receiver coil wirelessly receives energy from the power supply coil via at least one of: an inductive coupling or a magnetically resonant coupling between the receiver coil and the power supply coil.

Example 3 may include elements of example 1 where the hinge may include a plurality of hinges and where the hinge member may include a hinge synchronization member that operably pivotably couples at least two the plurality of hinges.

Example 4 may include elements of example 1 and may additionally include an energy storage device operably coupled to the receiver coil to receive power from the external power supply coil via the receiver coil.

Example 5 may include elements of example 1 where the hinge member may include a first portion of an exterior surface of the hinge member disposed proximate the receiver coil and a second portion of the exterior surface of the hinge member disposed proximate at least a portion of the at least two of the plurality of members.

Example 6 may include elements of example 5 where the first portion of the exterior surface of the hinge member may include a material at least partially transparent to at least a portion of electromagnetic field produced by the power supply coil.

Example 7 may include elements of example 6 where the second portion of the exterior surface of the hinge member may include an electrically conductive material, where the electronic device includes a chassis ground, and where the electrically conductive material is conductively coupled to the chassis ground.

Example 8 may include elements of example 6 where the second portion of the exterior surface of the hinge member may include a material at least partially opaque to at least a portion of electromagnetic field produced by the power supply coil.

Example 9 may include elements of example 1 where at least one of the plurality of members may include one or more detachable fasteners that permit the detachment of the respective member from the hinge member.

Example 10 may include elements of any of examples 1 through 9 where the plurality of members may include at least a base member and a display member and where the hinge member may be disposed proximate an exterior edge of the base member and an exterior edge of the display member.

Example 11 may include elements of example 10 where at least one of either the base member or the display member may include energy storage device conductively coupled to the receiver coil.

Example 12 may include elements of any of examples 1 through 9 where the electronic device may include a base member and a cover member and wherein the hinge member may be disposed proximate an exterior edge of the base member and an exterior edge of the cover member.

Example 13 may include elements of any of examples 1 through 9 where the hinge member may include an at least partially hollow member having the receiver coil at least partially disposed in the at least partially hollow member.

Example 14 may include elements of example 13 where the receiver coil may include a plurality of receiver coils disposed at least partially within the at least partially hollow member.

Example 15 may include elements of any of examples 1 through 9, and may additionally include a power supply that may include the power supply coil disposed in a location such that when the electronic device is disposed proximate the power supply station, the receiver coil is disposed proximate the power supply coil.

Example 16 may include elements of example 15 where the power supply may further include a magnetic alignment feature disposed in a location such that a magnetic field produced by the magnetic alignment feature aligns the receiver coil with the power supply coil when the electronic device is disposed proximate the power supply.

According to example 17, there is provided a power supply system. The power supply system may include a receiver coil and an energy storage device conductively coupled to the receiver coil. The power supply system may additionally include a hinge pivotably coupling a first member to a second member and a hinge member disposed proximate the hinge, the hinge member incorporating at least a portion of the receiver coil.

Example 18 may include elements of example 17 where the hinge may include a plurality of hinges and where the hinge member includes a hinge synchronization member that operably pivotably couples at least two of the plurality of hinges.

Example 19 may include elements if example 17 where the hinge member may include a hollow member; and where at least a portion of the receiver coil may be disposed at least partially within the hollow member.

Example 20 may include elements of example 17 where the receiver coil may be disposed at least partially on a portion of an exterior surface of the hinge member.

Example 21 may include elements of example 17 where the receiver coil may be disposed at least partially in a recess or aperture on an exterior surface of the hinge member.

Example 22 may include elements of claim 17 where a first portion of an exterior surface of the hinge member may include a material at least partially transparent to an electromagnetic field produced by a power supply coil and where the receiver coil may be disposed proximate first portion of the exterior surface of the hinge member.

Example 23 may include elements of example 22 where a second portion of an exterior surface of the hinge member may include a material at least partially opaque to the electromagnetic field produced by the power supply coil and where at least one of the first member or the second member may be disposed proximate the second portion of the exterior surface of the hinge member.

Example 24 may include elements of claim 17 where the receiver coil may include a plurality of receiver coils.

Example 25 may include elements of example 17 where the receiver coil may include a high aspect ratio receiver coil.

Example 26 may include elements of any of examples 17 through 25 and may additionally include a power supply and a power supply coil disposed in a location such that when the receiver coil is disposed proximate the power supply, the receiver coil is disposed proximate the power supply coil and, in operation, wirelessly receives power from one or more electromagnetic fields produced by the power supply coil.

Example 27 may include elements of example 26 where the receiver coil wirelessly receives power via at least one of: an inductive coupling or a magnetically resonant coupling between the receiver coil and the power supply coil.

Example 28 may include elements of example 26, and may additionally include a power supply base member physically coupled to the power supply and positioned such that placing at least one of the first member or the second member on the base member aligns the receiver coil with the power supply coil.

Example 29 may include elements of example 28 where the first member may remain pivotable about the hinge member when the second member is disposed proximate the power supply base member.

Example 30 may include elements of example 28 where the power supply may further include an alignment feature to cause the receiver coil to align with the power supply coil when at least one of either the first member or the second member is disposed proximate the power supply.

Example 31 may include elements of example 30 where the alignment feature may include a magnetic alignment feature.

Example 32 may include elements of example 30 where the alignment feature may include at least one of: a recessed alignment feature or a protruding alignment feature.

Example 33 may include elements of example 25 where the power supply coil may include a plurality of power supply coils.

According to example 34, there is provided a power supply method. The power supply method may include pivotably coupling, via a hinge, a first member to a second member, disposing a hinge member proximate the hinge; and incorporating a receiver coil at least partially in the hinge member, the receiver coil to wirelessly receive energy from an electromagnetic field produced by a power supply coil external to the hinge member.

Example 35 may include elements of example 34 where incorporating a receiver coil at least partially in the hinge member may include incorporating the receiver coil at least partially in the hinge member, the receiver coil to wirelessly receive energy from an electromagnetic field produced by the power supply coil via at least one of: an inductive coupling or a magnetically resonant coupling between the receiver coil and the power supply coil.

Example 36 may include elements of example 34, and may additionally include conductively coupling the receiver coil to an energy storage device disposed at least partially within at least one of the first member or the second member.

Example 37 may include elements of example 36, and may additionally include increasing an energy level of the energy storage device responsive to establishing a wireless energy transfer between the receiver coil and the power supply coil.

Example 38 may include elements of example 34, and may additionally include aligning the receiver coil and the power supply coil via an alignment feature external to the hinge member.

Example 39 may include elements of example 38 where aligning the receiver coil and the power supply coil via an alignment feature external to the hinge member may include aligning the receiver coil and the power supply coil via a magnetic alignment feature external to the hinge member.

Example 40 may include elements of example 38 where aligning the receiver coil and the power supply coil via an alignment feature external to the hinge member may include aligning the receiver coil and the power supply coil via a recessed alignment feature or a protruding alignment feature disposed external to the hinge member.

Example 41 may include elements of example 34 where incorporating a receiver coil at least partially in the hinge member may include at least one of: disposing the receiver coil at least partially within the hinge member; disposing the receiver coil at least partially on an exterior surface of the hinge member; or inserting at least a portion of the receiver coil at least partially in a recess or aperture on an exterior surface of the hinge member.

Example 42 may include elements of example 34 where incorporating a receiver coil at least partially in the hinge member may include incorporating at least a portion of each of a plurality of receiver coils at least partially in the hinge member.

Example 43 may include elements of example 34 where incorporating a receiver coil at least partially in the hinge member may include incorporating a high aspect ratio receiver coil at least partially in the hinge member.

Example 44 may include elements of example 34 where incorporating a receiver coil at least partially in the hinge member may include incorporating the receiver coil at least partially in the hinge member, at least a portion of the hinge member disposed proximate the receiver coil comprising a material at least partially transparent to an electromagnetic field produced by the power supply coil.

Example 45 may include elements of example 44 where incorporating a receiver coil at least partially in the hinge member further may include incorporating the receiver coil at least partially in the hinge member, at least a portion of the hinge member disposed proximate at least one of the first member or the second member comprising a material at least partially opaque to the electromagnetic field produced by the power supply coil.

According to example 46, there is provided a power supply system. The system may include a means for pivotably coupling a first member to a second member and a means for carrying a receiver coil, the coil carrying means disposed proximate the means for pivotably coupling the first member to the second member, the coil carrying means permitting the receiver coil to wirelessly receive energy via an electromagnetic field produced by a power supply coil, the power supply coil external to the means for pivotably coupling the first member to the second member.

Example 47 may include elements of example 46 where the coil carrying means permitting the receiver coil to wirelessly receive energy from the power supply coil may include at least one of: a coil carrying means permitting the receiver coil to wirelessly receive energy via an inductive coupling with the power supply coil or a coil carrying means permitting the receiver coil to wirelessly receive energy via magnetically resonant coupling with the power supply coil.

Example 48 may include elements of example 46 and may further include a means for conductively coupling the receiver coil to an energy storage device disposed at least partially within at least one of the first member or the second member.

Example 49 may include elements of example 48 and may additionally include a means for increasing an energy level of the energy storage device responsive wirelessly receiving energy from the power supply coil.

Example 50 may include elements of example 49 and may additionally include a means for aligning the receiver coil and the power supply coil.

Example 51 may include elements of example 50 where the means for aligning may include a magnetic alignment means.

Example 52 may include elements of example 50 where the means for aligning may include a recessed alignment fixture means or a protruding alignment fixture means.

Example 53 may include elements of example 46 where the means for disposing the receiver coil proximate the means for pivotably coupling the first member to the second member may include at least one of: a means for disposing the receiver coil at least partially within the coil carrying means, a means for disposing the receiver coil at least partially on an exterior surface of the coil carrying means, or a means for inserting at least a portion of the receiver coil at least partially in a recess or aperture on the coil carrying means.

Example 54 may include elements of example 46 where the means for carrying the receiver coil may include a means for carrying each of a plurality of receiver coils at least partially in, on, or about the coil carrying means.

Example 55 may include elements of example 46 where the means for carrying the receiver coil may include a means for carrying a high aspect ratio receiver coil at least partially in, on, or about the coil carrying means.

Example 56 may include elements of example 46 where the means for carrying the receiver coil may include a means for carrying the receiver coil that includes a first portion at least partially transparent to an electromagnetic field produced by the power supply coil disposed proximate the receiver coil.

Example 57 may include elements of example 56 where the means for carrying the receiver coil further may include a means for carrying the receiver coil that includes a second portion at least partially opaque to the electromagnetic field produced by the power supply coil, the second portion of the coil carrying means disposed proximate at least a portion of the first member and at least a portion of the second member.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A power supply system for an electrical device, comprising:
    an electronic device having a plurality of members, each of the members housing at least a portion of the electronic device;
    a hinge pivotably coupling at least two of the plurality of members; and a hinge member disposed proximate the hinge, the hinge member including a receiver coil capable of wirelessly receiving energy from a power supply coil disposed external to the electronic device.

2. The power supply system of claim 1 wherein the receiver coil wirelessly receives energy from the power supply coil via at least one of: an inductive coupling between the receiver coil and the power supply coil or a magnetically resonant coupling between the receiver coil and the power supply coil.

3. The power supply system of claim 1:
wherein the hinge includes a plurality of hinges; and
wherein the hinge member includes a hinge synchronization member that operably pivotably couples the at least two of the plurality of hinges.

4. The power supply system of claim 1, further including:
an energy storage device operably coupled to the receiver coil to receive energy from the power supply coil via the receiver coil.

5. The power supply system of claim 1 wherein the hinge member includes:
a first portion of an exterior surface of the hinge member disposed proximate the receiver coil; and
a second portion of the exterior surface of the hinge member disposed proximate at least a portion of the at least two of the plurality of members.

6. The power supply system of claim 5 wherein the first portion of the exterior surface of the hinge member includes material at least partially transparent to at least a portion of an electromagnetic field produced by the power supply coil.

7. The power supply system of claim 6:
wherein the second portion of the exterior surface of the hinge member includes an electrically conductive material;
wherein the electronic device includes a chassis ground; and
wherein the electrically conductive material is conductively coupled to the chassis ground.

8. The power supply system of claim 6 wherein the second portion of the exterior surface of the hinge member includes a material at least partially opaque to at least a portion of the electromagnetic field produced by the power supply coil.

9. The power supply system of claim 1 wherein at least one of the plurality of members includes one or more detachable fasteners that permit the detachment of the respective member from the hinge member.

10. The power supply system of claim 1:
wherein the electronic device includes a base member and a cover member; and
wherein the hinge member is disposed proximate an exterior edge of the base member and an exterior edge of the cover member.

11. The power supply system of claim 1 wherein the hinge member includes an at least partially hollow member having the receiver coil at least partially disposed in the at least partially hollow member.

12. The power supply system of claim 1, further including:
a power supply that includes the power supply coil disposed in a location such that when the electronic device is disposed proximate the power supply, the receiver coil is disposed proximate the power supply coil.

13. The power supply system of claim 12, wherein the power supply further includes a magnetic alignment feature disposed in a location such that a magnetic field produced by the magnetic alignment feature aligns the receiver coil with the power supply coil when the electronic device is disposed proximate the power supply.

14. A power supply method, comprising:
pivotably coupling, via a hinge, a first member of an electronic device to a second member of the electronic device, the first and second members housing at least a portion of the electronic device;
disposing a hinge member proximate the hinge; and
incorporating a receiver coil at least partially in the hinge member, the receiver coil to wirelessly receive energy from an electromagnetic field produced by a power supply coil disposed external to the hinge member.

15. The power supply method of claim 14 wherein
the receiver coil is to wirelessly receive power from the electromagnetic field produced by the power supply coil via at least one of: an inductive coupling between the receiver coil and the power supply coil or a magnetically resonant coupling between the receiver coil and the power supply coil.

16. The power supply method of claim 14, further including:
conductively coupling the receiver coil to an energy storage device disposed at least partially within at least one of the first member or the second member.

17. The power supply method of claim 16, further including:
increasing an energy level of the energy storage device responsive to establishing a wireless energy transfer between the receiver coil and the power supply coil.

18. The power supply method of claim 14 further including:
aligning the receiver coil and the power supply coil via an alignment feature, at least a portion of the alignment feature disposed external to the hinge member.

19. The power supply method of claim 18 wherein aligning the receiver coil and the power supply coil via the alignment feature disposed external to the hinge member includes at least one of:
aligning the receiver coil and the power supply coil via a magnetic alignment feature; or
aligning the receiver coil and the power supply coil via a recessed alignment feature or a protruding alignment feature.

20. The power supply method of claim 14 wherein incorporating the receiver coil at least partially in the hinge member includes at least one of:
disposing the receiver coil at least partially within the hinge member;
disposing the receiver coil at least partially on an exterior surface of the hinge member; or
inserting at least a portion of the receiver coil at least partially in a recess or aperture on an exterior surface of the hinge member.

21. The power supply method of claim 14 wherein incorporating the receiver coil at least partially in the hinge member includes at least one of:
incorporating at least a portion of each of a plurality of receiver coils at least partially in the hinge member;
incorporating a high aspect ratio receiver coil at least partially in the hinge member; or
incorporating the receiver coil at least partially in the hinge member, at least a portion of the hinge member proximate the receiver coil including a material at least partially transparent to the electromagnetic field produced by the power supply coil.

22. The power supply method of claim 21 wherein disposing the hinge member proximate the hinge includes disposing the hinge member proximate at least one of the first member or the second member, the hinge member including a material at least partially opaque to the electromagnetic field produced by the power supply coil.

23. A power supply system, comprising:
means for pivotably coupling a first member of an electronic device to a second member of the electronic device, the first and second members housing at least a portion of the electronic device; and
means for carrying a receiver coil, the means for carrying the receiver coil disposed proximate the means for pivotably coupling the first member to the second member, the means for carrying to permit the receiver coil to wirelessly receive energy via an electromagnetic field produced by a power supply coil, the power supply coil external to the means for pivotably coupling the first member to the second member.

24. The power supply system of claim 23 wherein the receiver coil is to wirelessly receive energy from the electromagnetic field produced by the power supply coil via at least one of: an inductive coupling or a magnetically resonant coupling between the receiver coil and the power supply coil.

25. The power supply system of claim 23, further including:
means for aligning the receiver coil and the power supply coil such that an energy transfer between the receiver coil and the power supply coil may occur via at least one of: an inductive coupling between the receiver coil and the power supply coil or a magnetically resonant coupling between the receiver coil and the power supply coil.

* * * * *